US012614471B2

(12) United States Patent
Kim et al.

(10) Patent No.: US 12,614,471 B2
(45) Date of Patent: Apr. 28, 2026

(54) VR-BASED SIMULATION METHOD AND DEVICE FOR SECONDARY BATTERY PRODUCTION

(71) Applicant: LG ENERGY SOLUTION, LTD., Seoul (KR)

(72) Inventors: Seungtae Kim, Daejeon (KR); Moo Hyun Yoo, Daejeon (KR); Daewoon Jung, Daejeon (KR); Youngduk Kim, Daejeon (KR); Nam Hyuck Kim, Daejeon (KR); Su Ho Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 350 days.

(21) Appl. No.: 18/273,966

(22) PCT Filed: Aug. 3, 2022

(86) PCT No.: PCT/KR2022/011463
§ 371 (c)(1),
(2) Date: Jul. 24, 2023

(87) PCT Pub. No.: WO2023/096076
PCT Pub. Date: Jun. 1, 2023

(65) Prior Publication Data
US 2024/0412663 A1      Dec. 12, 2024

(30) Foreign Application Priority Data

Nov. 24, 2021     (KR) ........................ 10-2021-0163787

(51) Int. Cl.
*G09B 19/24*          (2006.01)
*G02B 27/00*          (2006.01)
(Continued)

(52) U.S. Cl.
CPC ......... *G09B 19/24* (2013.01); *G02B 27/0093* (2013.01); *G02B 27/0101* (2013.01);
(Continued)

(58) Field of Classification Search
CPC ........ G09B 19/24; G09B 19/003; G09B 9/00; G05B 2219/32014; H01M 10/0404
See application file for complete search history.

(56) References Cited

U.S. PATENT DOCUMENTS

2009/0305204 A1* 12/2009 Connolly ................. G09B 7/02
434/219
2014/0242433 A1     8/2014 Kwon et al.
(Continued)

FOREIGN PATENT DOCUMENTS

CA          3103277  A1     1/2020
CN       106940941  A      7/2017
(Continued)

OTHER PUBLICATIONS

Korean Electronics Technology Institute (http://www.keti.re.kr), KETI-RIST lanches XR technology demonstration test in manufacturing, Press Release.

*Primary Examiner* — James S. McClellan
(74) *Attorney, Agent, or Firm* — Bryan Cave Leighton Paisner LLP

(57) ABSTRACT

Systems and methods for executing a virtual reality (VR)-based simulation for secondary battery production are disclosed. One method includes receiving a gaze direction and gaze location of a user identified from a HMD. Content associated with a secondary battery production apparatus corresponding to the received gaze direction and gaze location is displayed on an area of a display of the HMD. User behavior information indicating a motion of the user determined from at least one of the HMD or a controller associated with the HMD is obtained. The content associated
(Continued)

with the secondary battery production apparatus is executed based on the obtained user behavior information.

17 Claims, 12 Drawing Sheets

(51) Int. Cl.
*G02B 27/01*       (2006.01)
*G06F 3/01*       (2006.01)

(52) U.S. Cl.
CPC ........... *G02B 27/017* (2013.01); *G06F 3/013* (2013.01); *G02B 2027/0141* (2013.01)

(56) References Cited

U.S. PATENT DOCUMENTS

| | | | | |
|---|---|---|---|---|
| 2016/0077547 | A1* | 3/2016 | Aimone | ................. A61B 5/1114 |
| | | | | 345/8 |
| 2017/0170519 | A1* | 6/2017 | Ihara | ................. H01M 10/0567 |
| 2018/0011531 | A1 | 1/2018 | Clement et al. | |
| 2019/0392728 | A1* | 12/2019 | Pike | ..................... G09B 19/003 |
| 2020/0006743 | A1* | 1/2020 | Kamiya | ............. H01M 50/578 |
| 2020/0068190 | A1 | 2/2020 | Cheung | |
| 2021/0043011 | A1* | 2/2021 | Gates | ................... G02B 27/017 |
| 2021/0158715 | A1* | 5/2021 | Kim | ......................... G09B 9/00 |
| 2021/0167431 | A1* | 6/2021 | Lee | ..................... H01M 10/049 |
| 2021/0232216 | A1* | 7/2021 | Hudman | ............... G06N 3/047 |

FOREIGN PATENT DOCUMENTS

| | | | |
|---|---|---|---|
| CN | 107169212 | A | 9/2017 |
| CN | 107229343 | A | 10/2017 |
| CN | 108646926 | A | 10/2018 |
| JP | 2019-197165 | A | 11/2019 |
| JP | 2020106574 | A | 7/2020 |
| JP | 2020184419 | A | 11/2020 |
| JP | 2021-173867 | A | 11/2021 |
| KR | 10-1303994 | B1 | 9/2013 |
| KR | 10-1304312 | B1 | 9/2013 |
| KR | 101498610 | B1 | 3/2015 |
| KR | 10-1644462 | B1 | 8/2016 |
| KR | 10-1819729 | B1 | 3/2018 |
| KR | 10-1917434 | B1 | 11/2018 |
| KR | 10-1933533 | B1 | 4/2019 |
| KR | 20200047326 | A | 5/2020 |
| KR | 102124879 | B1 | 6/2020 |
| KR | 20200118694 | A | 10/2020 |

* cited by examiner

600

Cut disconnected electrode end in straight line along indicated dotted line using cutter knife.

610

620

700

710

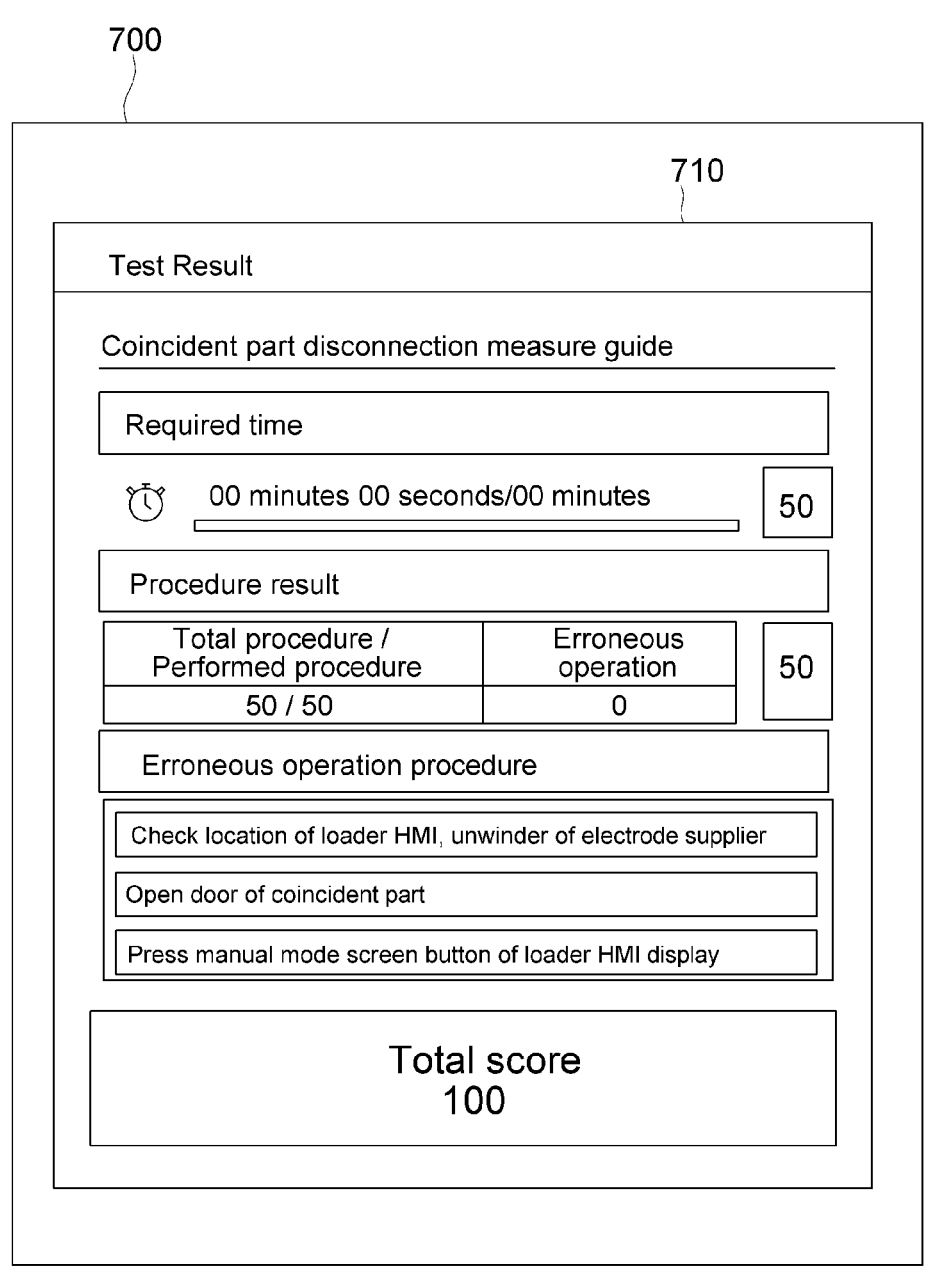

Test Result

Coincident part disconnection measure guide

| Required time |
| --- |

00 minutes 00 seconds/00 minutes    50

| Procedure result |
| --- |

| Total procedure /<br>Performed procedure | Erroneous<br>operation | 50 |
| --- | --- | --- |
| 50 / 50 | 0 | |

| Erroneous operation procedure |
| --- |

Check location of loader HMI, unwinder of electrode supplier

Open door of coincident part

Press manual mode screen button of loader HMI display

Total score
100

External apparatus

Error information (812)

Simulation device

Defect scenario (822)

Defect scenario DB

810

820

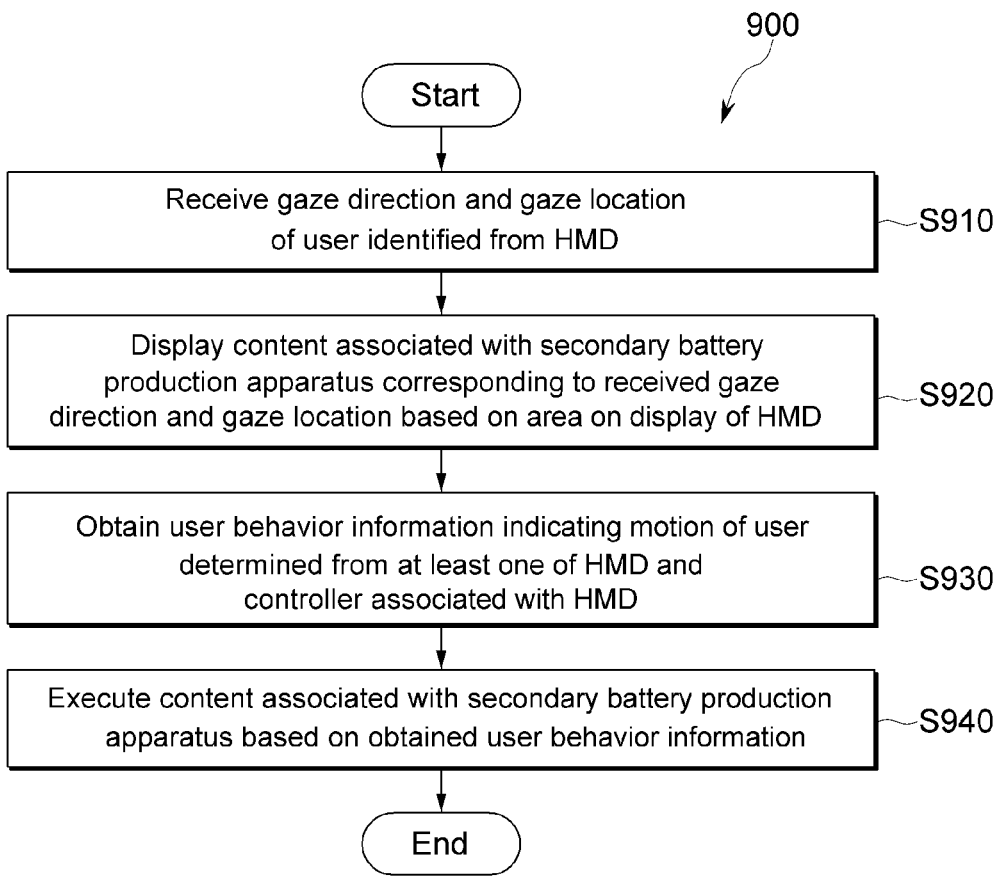

900

Start

Receive gaze direction and gaze location
of user identified from HMD ~S910

Display content associated with secondary battery
production apparatus corresponding to received gaze
direction and gaze location based on area on display of HMD ~S920

Obtain user behavior information indicating motion of user
determined from at least one of HMD and
controller associated with HMD ~S930

Execute content associated with secondary battery production
apparatus based on obtained user behavior information ~S940

End

FIG. 9

VR-BASED SIMULATION METHOD AND DEVICE FOR SECONDARY BATTERY PRODUCTION

CROSS-REFERENCE TO RELATED APPLICATION

This application is a National Phase entry pursuant to 35 U.S.C. 371 of International Application No. PCT/KR2022/011463 filed on Aug. 3, 2022, which claims priority to and the benefit of Korean Patent Application No. 2021-0163787 filed on Nov. 24, 2021, the disclosure of which is incorporated herein by reference in its entirety.

TECHNICAL FIELD

The following description relates to a VR-based simulation method and device for secondary battery production, and to a VR-based simulation method and device for training secondary battery production workers.

BACKGROUND

Due to recent growth of the electric vehicle market, demand for development and production of secondary batteries is rapidly increasing. In response to such an increase in demand for secondary batteries, the number of production plants for secondary battery production is also increasing. However, the number of skilled workers for operating such a secondary battery production plant is remarkably insufficient.

On the other hand, in the past, training and education of new workers was conducted by watching and learning skilled workers, but it was difficult to train and educate new workers for a long time due to a busy secondary battery production schedule. In addition, there is an issue in that it is difficult to sufficiently secure skilled workers due to frequent retirement of workers. In addition, even if a worker is trained on a general method of operating a plant, it is not easy for the worker to immediately respond to various types of defect situations that may occur during the operation of the plant.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure provides a VR-based simulation method for secondary battery production, a computer program stored in a non-transitory computer-readable medium, a non-transitory computer-readable medium in which a computer program is stored, and a device (system) for solving the above issues.

The present disclosure may be implemented in a variety of ways, including a method, a device (system), a computer program stored in a non-transitory computer-readable medium, or a non-transitory computer-readable medium in which the computer program is stored.

According to an aspect, there is provided a virtual reality (VR) based simulation device for secondary battery production, including a memory configured to store at least one instruction, and at least one processor configured to execute the at least one instruction stored in the memory to perform operations. The operations may include receiving a gaze direction and gaze location of a user identified from a head mounted display (HMD), displaying content associated with a secondary battery production apparatus corresponding to the received gaze direction and gaze location on an area of a display of the HMD, obtaining user behavior information indicating a motion of the user determined from at least one of the HMD or a controller associated with the HMD, and executing the content associated with the secondary battery production apparatus based on the obtained user behavior information.

According to an example embodiment, for the operations may further include determining one or more training scenarios among a plurality of training scenarios associated with the secondary battery production apparatus, and changing the content associated with the secondary battery production apparatus based on the determined one or more training scenarios.

According to an example embodiment, the plurality of training scenarios includes an electrode replacement scenario associated with the secondary battery production apparatus. The operations may include, upon determining the one or more training scenarios include the electrode replacement scenario, determining one or more electrode suppliers requiring electrode replacement among a plurality of electrode suppliers associated with the secondary battery production apparatus, obtaining first user behavior information for manipulating the determined one or more electrode suppliers, and for cutting and connecting electrodes associated with the one or more electrode suppliers, and determining whether the electrode replacement scenario is completed based on the obtained first user behavior information.

According to an example embodiment, the plurality of training scenarios includes a separator replacement scenario associated with the secondary battery production apparatus. The operations may further include, when the determined one or more training scenarios include the separator replacement scenario, determining one or more separator suppliers requiring separator replacement among a plurality of separator suppliers associated with the secondary battery production apparatus, obtaining second user behavior information for manipulating the determined one or more separator suppliers, for discarding exhausted separators associated with the one or more separator suppliers, and for manipulating HMI after inserting a new separator to prepare an auto splice, and determining whether the separator replacement scenario is completed based on the obtained second user behavior information.

According to an example embodiment, the plurality of training scenarios may include a stacking tape replacement scenario associated with the secondary battery production apparatus. The operations may further include, when the determined one or more training scenarios include the stacking tape replacement scenario, determining one or more tape suppliers requiring tape replacement among a plurality of tape suppliers associated with the secondary battery production apparatus, obtaining third user behavior information for manipulating the determined one or more tape suppliers, for removing exhausted tapes from the one or more tape suppliers and inserting a new tape, and for determining whether the stacking tape replacement scenario is completed based on the obtained third user behavior information.

According to an example embodiment, the plurality of training scenarios may include a quality check scenario of a material generated by the secondary battery production apparatus. The operations may include, when the determined one or more training scenarios include the quality check scenario, obtaining fourth user behavior information for determining at least one of a dimension, a cutting state, or a sealing state of the material generated by the secondary battery production apparatus, and determining whether the quality check scenario is completed based on the obtained fourth user behavior information.

According to an example embodiment, the plurality of training scenarios may include a screening scenario for screening defective materials. The operations may further include, when the determined one or more training scenarios include the screening scenario, obtaining fifth user behavior information for extracting a mono-cell from a stacked cell generated by the secondary battery production apparatus, for measuring an insulation resistance of the extracted mono-cell, for performing an electrode surface condition inspection and for measuring a gap between an electrode and a separator and whether a shoulder line is defective, and determining whether the screening scenario is completed based on the obtained fifth user behavior information.

According to an example embodiment, the plurality of training scenarios may include a disconnection measure scenario. The operations may further include, when the determined one or more training scenarios include the disconnection measure scenario, determining a disconnection location associated with the secondary battery production apparatus, obtaining sixth user behavior information for removing a disconnected electrode at the determined disconnection location and for connecting a new electrode, and determining whether the disconnection measure scenario is completed based on the obtained sixth user behavior information.

According to an example embodiment, the operations may further include determining whether at least some of the plurality of training scenarios associated with the secondary battery production apparatus are completed by the user, upon determining the at least one of the plurality of training scenarios is completed, calculating operation capability information of the user corresponding to the completed at least one of the completed plurality of training scenarios, and displaying the calculated operation capability information of the user together with the content associated with the secondary battery production apparatus.

According to an example embodiment, the operations may further include determining whether the user satisfies a guide condition based on the gaze direction and gaze location of the user, and upon determining that the user satisfies the guide condition, displaying user guide information associated with the determined one or more training scenarios together with the content associated with the secondary battery production apparatus.

According to another aspect, there is provided a VR-based simulation method for secondary battery production performed by at least one processor, the method may include receiving a gaze direction and gaze location of a user identified from a HMD, displaying content associated with a secondary battery production apparatus corresponding to the received gaze direction and gaze location on an area of a display of the HMD, obtaining user behavior information indicating a motion of the user determined from at least one of the HMD or a controller associated with the HMD, and executing the content associated with the secondary battery production apparatus based on the obtained user behavior information.

According to an example embodiment, the method may further include determining one or more training scenarios among a plurality of training scenarios associated with the secondary battery production apparatus, and changing the content associated with the secondary battery production apparatus based on the determined one or more training scenarios.

According to an example embodiment, the plurality of training scenarios may include an electrode replacement scenario associated with the secondary battery production apparatus. The method may further include, when the determined one or more training scenarios include the electrode replacement scenario, determining one or more electrode suppliers requiring electrode replacement among a plurality of electrode suppliers associated with the secondary battery production apparatus, obtaining first user behavior information for manipulating the determined one or more electrode suppliers, and for cutting and connecting electrodes associated with the one or more electrode suppliers, and determining whether the electrode replacement scenario is completed based on the obtained first user behavior information.

According to an example embodiment, the plurality of training scenarios may include a separator replacement scenario associated with the secondary battery production apparatus. The method may further include, when the determined one or more training scenarios include the separator replacement scenario, determining one or more separator suppliers requiring separator replacement among a plurality of separator suppliers associated with the secondary battery production apparatus, obtaining second user behavior information for manipulating the determined one or more separator suppliers, for discarding exhausted separators associated with the one or more separator suppliers, and for manipulating HMI after inserting a new separator to prepare an auto splice, and determining whether the separator replacement scenario is completed based on the obtained second user behavior information.

According to an example embodiment, the plurality of training scenarios may include a stacking tape replacement scenario associated with the secondary battery production apparatus. The method may further include, when the determined one or more training scenarios include the stacking tape replacement scenario, determining one or more tape suppliers requiring tape replacement among a plurality of tape suppliers associated with the secondary battery production apparatus, obtaining third user behavior information for manipulating the determined one or more tape suppliers, for removing exhausted tapes from the one or more tape suppliers and inserting a new tape, and for determining whether the stacking tape replacement scenario is completed based on the obtained third user behavior information.

According to an example embodiment, the plurality of training scenarios may include a quality check scenario of a material generated by the secondary battery production apparatus. The method may further include, when the determined one or more training scenarios include the quality check scenario, obtaining fourth user behavior information for determining at least one of a dimension, a cutting state, or a sealing state of the material generated by the secondary battery production apparatus, and determining whether the quality check scenario is completed based on the obtained fourth user behavior information.

According to an example embodiment, the plurality of training scenarios may include a screening scenario for screening defective materials. The method may further include, when the determined one or more training scenarios include the screening scenario, obtaining fifth user behavior information for extracting a mono-cell from a stacked cell generated by the secondary battery production apparatus, for measuring an insulation resistance of the extracted mono-cell, for performing an electrode surface condition inspection, and for measuring a gap between an electrode and a separator and whether a shoulder line is defective, and determining whether the screening scenario is completed based on the obtained fifth user behavior information.

According to an example embodiment, the plurality of training scenarios may include a disconnection measure scenario. The method may further include, when the determined one or more training scenarios include the disconnection measure scenario, determining a disconnection location associated with the secondary battery production apparatus, obtaining sixth user behavior information for removing a disconnected electrode at the determined disconnection location and for connecting a new electrode, and determining whether the disconnection measure scenario is completed based on the obtained sixth user behavior information.

According to an example embodiment, the method further may include determining whether at least one of the plurality of training scenarios associated with the secondary battery production apparatus are completed by the user, upon determining the at least one of the plurality of training scenarios is completed, calculating operation capability information of the user corresponding to the completed at least one of the plurality of training scenarios, and displaying the calculated operation capability information of the user together with the content associated with the secondary battery production apparatus.

According to an example embodiment, the method may further include determining whether the user satisfies a guide condition based on the gaze direction and gaze location of the user, and upon determining that the user satisfies the guide condition, displaying user guide information associated with the determined one or more training scenarios together with the content associated with the secondary battery production apparatus.

According another aspect, a non-transitory computer-readable medium storing instructions for executing a virtual reality (VR)-based simulation method for secondary battery production may be provided. The instructions, when executed by one or more processors, may cause the one or more processors to perform operations comprising: receiving a gaze direction and gaze location of a user identified from a head mounted display (HMD); displaying content associated with a secondary battery production apparatus corresponding to the received gaze direction and gaze location on an area of a display of the HMD; obtaining user behavior information indicating a motion of the user determined from at least one of the HMD or a controller associated with the HMD; and executing the content associated with the secondary battery production apparatus based on the obtained user behavior information.

In various example embodiments of the present disclosure, the user performing secondary battery production may perform training associated with an operation method of the secondary battery production apparatus and a handling method when a defect occurs through the simulation device before being put into work, and by training the user in this way, the loss due to the occurrence of defects is remarkably reduced, so that the efficiency of the secondary battery production operation may be effectively improved.

In various example embodiments of the present disclosure, by generating a defect scenario based on error information in a real apparatus, the simulation device may effectively generate training content optimized for the real work environment.

In various example embodiments of the present disclosure, the simulation device may generate and provide a training scenario and/or a defect scenario having various values associated with the secondary battery production apparatus to the user, and accordingly, the user may train the operation method of the apparatus or effectively learn a countermeasure for each malfunction situation while solving a malfunction situation that may occur in the real apparatus by himself/herself.

In various example embodiments of the present disclosure, the user may use a virtual VR-based simulation device to operate the secondary battery production apparatus in advance, and accordingly, when input to a real production process, losses that may be incurred by new operators may be significantly reduced.

In various example embodiments of the present disclosure, even when the user does not know how to respond to a training scenario, training may be effectively performed using user guide information.

In various example embodiments of the present disclosure, the user may intensively train only a training scenario with a low job proficiency by simply identifying and processing a training scenario lacking training.

The effect of the present disclosure is not limited to the above-mentioned effects, and other effects not mentioned will be apparent to those of ordinary skill in the art (referred to as "those skilled in the art") from the description of the claims.

BRIEF DESCRIPTION OF THE DRAWINGS

Embodiments of the present disclosure will be described with reference to the accompanying drawings described below, in which like reference numerals denote like elements, but are not limited thereto.

FIG. 7 is a diagram illustrating an example of a display screen on which operation capability information is displayed according to an example embodiment.

FIG. 9 is a diagram illustrating an example of a VR-based simulation method for producing a secondary battery according to an example embodiment.

FIG. 12 is a diagram illustrating an exemplary computing device for performing the above-described method and/or example embodiment, and the like.

DETAILED DESCRIPTION

Figure 1:
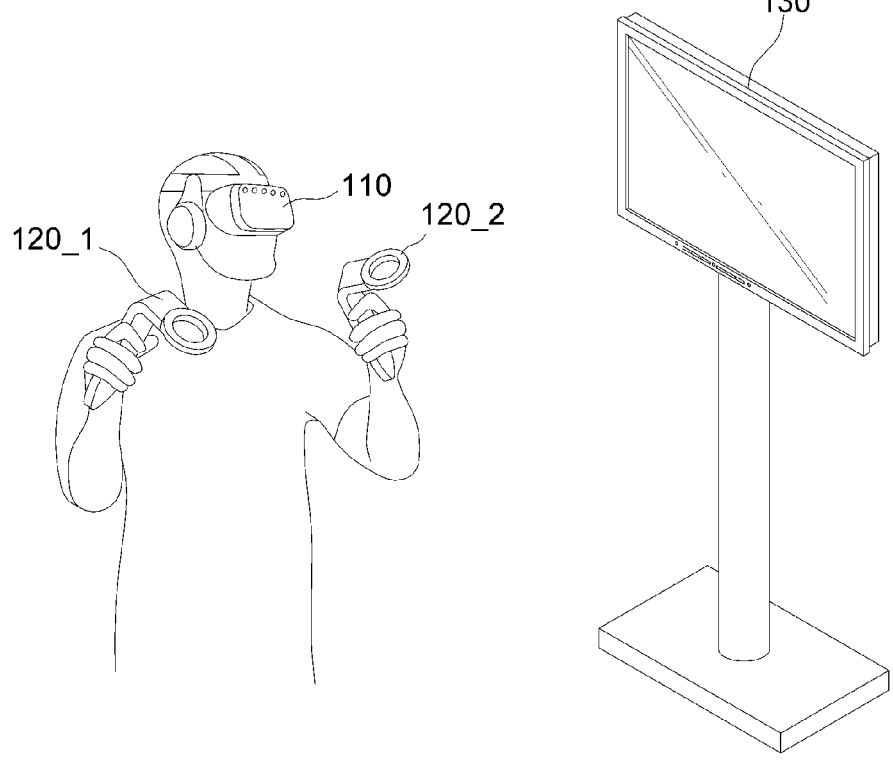
FIG. 1 is a diagram illustrating an example in which a user uses a VR-based simulation device according to an example embodiment.

Hereinafter, example embodiments will be described in detail with reference to the accompanying drawings. However, in the following description, if there is a concern of unnecessarily obscuring the gist of the present disclosure, detailed descriptions of well-known functions or configurations will be omitted.

When describing the example embodiments with reference to the accompanying drawings, like reference numerals refer to like components and a repeated description related thereto will be omitted. In addition, in the description of the example embodiments below, overlapping description of the same or corresponding components may be omitted. However, even if description regarding components is omitted, it is not intended that such components are not included in any example embodiment.

Advantages and features of the example embodiments disclosed herein, and methods of achieving them, will become apparent with reference to the example embodiments described below in conjunction with the accompanying drawings. However, the present disclosure is not limited to the example embodiments disclosed below, but may be implemented in various different forms, and the example embodiments are provided merely to fully inform those skilled in the art related to the present disclosure the scope of the disclosure.

Terms used herein will be briefly described, and disclosed example embodiments will be described in detail. The terms used herein have been selected as currently widely used general terms as possible while considering the functions in the present disclosure, but these may vary depending on the intention, precedent, or emergence of new technology of those of ordinary skill in the relevant field. In addition, in a specific case, there is a term arbitrarily selected by the applicant, and in this case, the meaning will be described in detail in the description of the corresponding disclosure. Therefore, the terms used herein should be defined based on the meaning of the term and the overall contents of the present disclosure, rather than the simple name of the term.

Expressions in the singular herein include plural expressions unless the context clearly dictates the singular. As used herein, the singular forms are intended to include the plural forms as well, unless the context clearly indicates otherwise. As used herein, when a part includes a certain component, this means that other components may be further included, rather than excluding other components, unless otherwise stated.

It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

When it is mentioned that one component is "coupled", "combined", "connected", "associated", or "react" to any other component, the particular component may be directly coupled, combined, connected, associated and/or react to another component, but is not limited thereto. For example, there may be one or more intermediate components between a particular component and another component. As used herein, the term "and/or" includes any one and any combination of any two or more of the associated listed items.

Although terms of "first," "second," and the like are used to explain various components, the components are not limited to such terms. For example, a first component may be referred to as a second component, or similarly, the second component may be referred to as the first component within the scope of the present disclosure.

As used herein, a "secondary battery" may refer to a battery made by using a material in which an oxidation-reduction process between an electric current and a material may be repeated several times. For example, to produce a secondary battery, mixing, coating, roll pressing, slitting, notching and drying, lamination, folding and stacking, lamination and stacking, packaging, charging/discharging, degassing, characteristic inspection, etc., may be performed. In this case, separate production equipment (apparatus) for performing each process may be used. Here, each production equipment may be operated according to adjustment parameters and set values set or changed by the user.

As used herein, a "user" may refer to a worker who performs secondary battery production and operates secondary battery production equipment, and may include users training through a simulation device (e.g., a VR-based simulation device) for secondary battery production equipment. In addition, a "user account" is an ID created to use the simulation device or assigned to each user, and the user may log-in on the simulation device using the user account and perform the simulation, but is not limited thereto.

As used herein, a "virtual secondary battery production apparatus" is a virtual apparatus that implements a real secondary battery production apparatus in VR, and may operate by executing, changing, and/or correcting an image, video, animation, etc., of a virtual apparatus according to information input (e.g. user input information and/or user behavior information) by a user. In other words, an "operation of the virtual secondary battery production apparatus" may include an image, video, animation, etc., of the virtual apparatus to be executed, changed and/or corrected. For example, the virtual secondary battery production apparatus may include a device for performing mixing, coating, roll pressing, slitting, notching and drying, lamination, folding and stacking, lamination and stacking, packaging, charging/discharging, degassing, and characteristic inspection, respectively.

As used herein, a "user behavior information" may include a user input for setting or changing conditions and/or values of at least some of the adjustment parameters, or information generated by a predetermined algorithm based on the user input. In addition, the user behavior information may include a user input such as a touch input, a drag input, a pinch input, a rotation input performed on at least a partial region of the virtual secondary battery production apparatus, or may be information generated by a predetermined algorithm based on a corresponding user input.

As used herein, a "training scenario" may include a simulation scenario for operating the secondary battery production apparatus. For example, when the secondary battery production apparatus is an L&S device, the training scenario may include an electrode replacement scenario, a separator replacement scenario, a stacking tape replacement scenario, a quality check scenario, a screening scenario, a disconnection measure scenario, etc. Here, the training scenario may include a defect scenario.

As used herein, a "defect scenario" may refer to a simulation scenario including a value, condition, etc., for changing the operation of the secondary battery production apparatus to a malfunctioning range or changing the quality information of a material determined by the operation of the secondary battery production apparatus to a defective range. For example, when a defect scenario is generated during operation of the simulation device, the operation of the secondary battery production apparatus, quality information, etc., may be changed based on the generated defect scenario. In addition, when the operation, quality information, etc., of the secondary battery production apparatus changed by the defect scenario are corrected to a normal range, the defect scenario may be determined to be resolved.

As used herein, a "mixing process" may be a process of preparing a slurry by mixing an active material, a binder, and other additives with a solvent. For example, a user may determine or adjust the addition ratio of an active material, a conductive material, an additive, a binder, and the like, in order to prepare a slurry of a specific quality. In addition, as used herein, a "coating process" may be a process of applying the slurry on a foil in a certain amount and shape. For example, a user may determine or adjust the die, slurry temperature, etc., of the coater device to achieve a coating having a specific quality, quantity and shape.

As used herein, a "rolling process" may be a process in which the coated electrode is passed between two rotating upper and lower rolls and pressed to a certain thickness. For example, the user may determine or adjust the spacing between rolls, etc., in order to maximize the capacity of the cell by increasing the electrode density with the rolling process. In addition, as used herein, a "slitting process" may be a process of cutting the electrode to a predetermined width by passing the electrode between two rotating knives. For example, a user may determine or adjust various adjustment parameters to maintain a constant electrode width.

As used herein, a "notching and drying process" may be a process of removing moisture after punching an electrode in a certain shape. For example, a user may determine or adjust the height of cut, length, etc., to perform punching into a certain quality shape. In addition, as used herein, a "lamination process" may be a process of sealing and cutting the electrode and the separator. For example, the user may determine or adjust a value corresponding to the x-axis, a value corresponding to the y-axis, and the like in order to perform cutting of a specific quality. In addition, as used herein, a "stacking process" may be a process of stacking cells on which lamination has been performed to generate a stacked cell. Here, an "L&S process" may be a combination of a lamination process and a stacking process.

As used herein, a "packaging process" may be a process of attaching a lead and a tape to an assembled cell and packaging it in an aluminum pouch, and a "degassing process" may be a process of removing gas in the cell to prevent inflow of internal air and leakage of electrolyte. In addition, as used herein, a "characteristics inspection process" may be a process of confirming characteristics such as thickness, weight, and insulation voltage of a cell by using a measuring device before shipment of the cell. In the case of such a process, a user may adjust conditions, values, etc., of various adjustment parameters so that each process may be performed with a specific quality within a normal range, or may change a set value corresponding to the device.

As used herein, a "mono-cell" may be generated by sequentially stacking a positive electrode, a separator, a negative electrode, and a separator. In other words, the mono-cell may be formed by alternately arranging electrodes (anode and/or cathode) and a separator and attaching each layer. Such mono-cells may be included in the electrode assembly included in the secondary battery.

FIG. 1 is a diagram illustrating an example in which a user uses a virtual reality (VR)-based simulation device according to an example embodiment. As shown, the user may use the simulation device using a head mounted display (HMD) 110 and two controllers 120_1 and 120_2. Here, the simulation device (not shown) is a device for training a secondary battery production worker (e.g., a user), and may be a device for communicating with the HMD 110 and the controller 120 to obtain user behavior information, and providing VR-based content (e.g., images, videos, animations, etc.) that is executed or changed according to the obtained user behavior information. For example, the user may learn how to use the secondary battery production apparatus or train a response method when the quality of the product is deteriorated, using a simulation device that implements the real secondary battery production apparatus in VR.

According to an example embodiment, the simulation device may receive the user's gaze direction and gaze location identified from the HMD 110, and display content associated with the secondary battery production apparatus corresponding to the gaze direction and gaze location received based on the area on the display of the HMD 110. Here, the HMD 110 may be a display device worn on the head and used, and may include various components, for example, one or more camera sensors, a gyro sensor, an acceleration sensor, a microphone, a speaker, a button using a touch panel, an input/output port, and a vibrator for vibration. In other words, the HMD 110 may estimate the user's head movement and/or gaze direction using such various sensors, or estimate the user's gaze location, gaze depth and the like using a camera sensor and the like that tracks the user's eye movement. In addition, the content associated with the secondary battery production apparatus may refer to content implemented in virtual reality of a real secondary battery production plant and/or equipment. In other words, the user may be provided with a feeling similar to performing work in the real secondary battery production plant through the content output through the HMD 110. Additionally, content associated with the secondary battery production apparatus according to the user's head movement and/or gaze direction may be output or displayed together on the separate monitor 130.

According to an example embodiment, the simulation device may obtain user behavior information indicating the user's motion determined from the controller 120 associated with the HMD 110, and execute the content associated with the secondary battery production apparatus based on the obtained user behavior information. Here, the controller 120 may include various components such as a gyro sensor, an acceleration sensor, a button using a touch panel, an input/output port, a vibrator for vibration and the like for tracking and reflecting the user's hand motion, shape and the like using the content associated with the VR-based secondary battery production apparatus, but is not limited thereto. In other words, the controller 120 may estimate the user's motion by using these various sensors, and the simulation device may execute content associated with the secondary battery production apparatus by obtaining user behavior information indicating the user's motion and operating the VR-based secondary battery production apparatus.

According to an example embodiment, the user may use VR-based content associated with the secondary battery production apparatus to train or learn how to operate the secondary battery production apparatus, how to deal with a defect, and the like. For example, when receiving an input for setting and/or changing condition values of at least some of a plurality of adjustment parameters (e.g., multiple adjustment parameters included in the equipment moving part in the content) for operating a virtual secondary battery production apparatus from a user, or when receiving an input for setting and/or changing the set value of the virtual secondary battery production apparatus by performing a physical action on the virtual secondary battery production apparatus, the simulation device may operate the virtual secondary battery production apparatus according to a corresponding condition value and/or a set value. In other words, the simulation device may correct the operation of the virtual secondary battery production apparatus according to the condition value and/or the set value, and modify the material (e.g., mono cell, etc.) and/or quality information of the material (e.g., quality information included in the quality check part in the content) according to the corrected operation.

According to an example embodiment, the simulation device may determine one or more quality parameters for determining the quality of the material produced by the virtual secondary battery production apparatus, and while the operation of the virtual secondary battery production apparatus is being executed, may calculate a value corresponding to each of one or more quality parameters determined based on the operation of the virtual secondary battery production apparatus being executed. Then, the simulation device may generate and display quality information associated with the quality of the material generated by the virtual secondary battery production apparatus based on the values corresponding to each of the calculated one or more quality parameters. In other words, the user may correct the operation of the virtual secondary battery production apparatus by changing the condition value of at least some of the plurality of adjustment parameters or changing the set value, and in this case, the simulation device may adaptively calculate and display quality information according to the corrected operation of the virtual secondary battery production apparatus.

FIG. 1 shows that one user uses the simulation device, but example embodiments are not limited thereto, and a plurality of users may use the simulation device at the same time. With such a configuration, the user performing secondary battery production may perform training related to the operation method of the secondary battery production apparatus through the simulation device and how to deal with a defect before being put into work, and by training the user in this way, the loss due to the occurrence of defects is remarkably reduced, so that the efficiency of the secondary battery production operation may be effectively improved.

Figure 2:
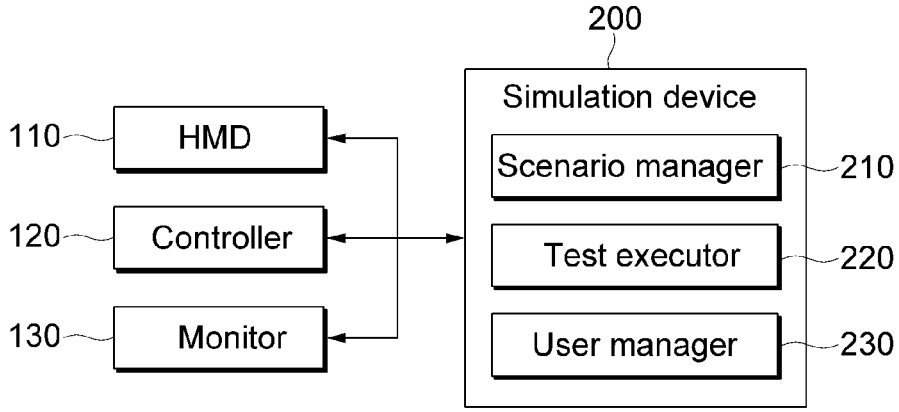
FIG. 2 is a functional block diagram illustrating an internal configuration of a simulation device according to an example embodiment.

FIG. 2 is a functional block diagram illustrating an internal configuration of a simulation device 200 according to an example embodiment. As shown, the simulation device 200 may include a scenario manager 210, a test executor 220, a user manager 230, and the like, but is not limited thereto. The simulation device 200 may communicate with the HMD 110, the controller 120, the monitor 130, and the like, and may exchange data and/or information associated with VR-based content.

According to an example embodiment, the scenario manager 210 may determine one or more training scenarios among a plurality of training scenarios associated with the secondary battery production apparatus, and change content associated with the secondary battery production apparatus based on the determined one or more training scenarios. For example, if the secondary battery production apparatus is an L&S device, the plurality of training scenarios may include an electrode replacement scenario, a separator replacement scenario, a stacking tape replacement scenario, a quality check scenario, a screening scenario, a disconnection measure scenario, etc. In this case, the scenario manager 210 may determine a training scenario by extracting at least one of an electrode replacement scenario, a separator replacement scenario, a stacking tape replacement scenario, a quality check scenario, a screening scenario, and a disconnection measure scenario, and change adjustment parameters, operations, quality information, and the like of the virtual secondary battery production apparatus according to the extracted or determined training scenario.

According to an example embodiment, when a training scenario is generated, a user may change an adjustment parameter to solve the generated training scenario, or may change a setting of a virtual secondary battery production apparatus. In this case, the scenario manager 210 may receive user behavior information for solving the determined one or more training scenarios, and correct the changed operation of the virtual secondary battery production apparatus based on the received user behavior information. In addition, while the operation of the corrected virtual secondary battery production apparatus is executed, the scenario manager 210 may calculate values corresponding to each of a plurality of quality parameters associated with the quality of a material generated by the virtual secondary battery production apparatus based on the operation of the virtual secondary battery production apparatus being executed, and correct the quality information associated with the quality of the material generated by the corrected virtual secondary battery production apparatus based on values corresponding to each of the plurality of calculated quality parameters.

According to an example embodiment, the scenario manager 210 may determine that the training scenario has been resolved when the user performs the operations corresponding to each training scenario with an accuracy greater than or equal to a predetermined criterion in a predetermined order. For example, when a separator replacement scenario is generated, the user may i) check the location of the un-winder in which the separator is exhausted on the human machine interface (HMI) associated with the secondary battery production apparatus, ii) remove the exhausted separator, iii) insert a new separator, and then manipulate the HMI to prepare the next auto splice in order. In this case, the scenario manager 210 may determine whether the training scenario has been resolved based on whether a series of operations are performed in a predetermined order based on user behavior information and whether cutting and the like is performed with high accuracy.

Additionally or alternatively, the scenario manager 210 may determine whether one or more training scenarios have been resolved using the corrected quality information associated with the virtual secondary battery production apparatus. For example, when the quality of the material is within a predetermined normal range, the scenario manager 210 may determine that the training scenario has been solved, but is not limited thereto, and when the value of each quality parameter included in the quality information corresponds to a predetermined normal range or a specific value, the scenario manager 210 may determine that the training scenario has been resolved. Additionally or alternatively, when a value calculated by providing each quality parameter to an arbitrary algorithm falls within a predetermined normal range, the scenario manager 210 may determine that the training scenario has been resolved.

According to an example embodiment, the scenario manager 210 may determine one or more defect scenarios among a plurality of defect scenarios associated with the secondary battery production apparatus, and change content associated with the secondary battery production apparatus based on the determined one or more defect scenarios. For example, when the virtual secondary battery production apparatus is an L&S device, the defect scenario may include an x-axis mismatch scenario, a y-axis mismatch scenario, and a cutting defect scenario associated with a mono-cell generated by the L&S device, but not limited thereto. In this case, the scenario manager 210 may determine a defect scenario by extracting at least one of the associated x-axis mismatch scenario, the y-axis mismatch scenario, and the cutting defect scenario, and may change adjustment parameters, operations, quality information and the like of the virtual secondary battery production apparatus according to the extracted or determined defect scenario.

According to an example embodiment, the set value, condition value, and the like of the virtual secondary battery production apparatus, which is changed to a malfunction range by the defect scenario, may be predetermined for each defect scenario, but is not limited thereto. For example, the defect scenario may be generated based on error information generated during a malfunction of real secondary battery production equipment. In other words, when a malfunction occurs in an external apparatus (e.g., the real secondary battery production apparatus) associated with the virtual secondary battery production apparatus, the scenario manager 210 obtains error information associated with the malfunction, and generate a defect scenario associated with the malfunction of the virtual secondary battery production apparatus based on the obtained error information. For example, when a malfunction occurs in the L&S device, the scenario manager 210 may obtain a value of each adjustment parameter and a set value of the L&S device at the time of the malfunction as error information. The scenario manager 210 may generate a defect scenario by changing the values of the respective adjustment parameters and the device set values obtained in this way to correspond to the virtual secondary battery production apparatus. With such a configuration, a defect scenario is generated based on error information in the real apparatus, so that the simulation device 200 may effectively generate training content optimized for the real working environment.

According to an example embodiment, the test performer 220 may determine whether one or more training scenarios (or one or more defect scenarios) are resolved, and when one or more training scenarios are determined to be resolved, may calculate a running time of one or more training scenarios while the one or more training scenarios are in progress, a value obtained by converting an erroneous operation procedure into a score, and the like. For example, the score may be converted by comparing the execution time for each training item with the standard time, and the value may be calculated through an arbitrary algorithm predetermined based on the number of erroneous operation procedures being compared with the existing correct procedure, and the like being converted into a score. In addition, the test executor 220 may check the calculated execution time and erroneous operation procedure to generate operation capability information for the virtual secondary battery production apparatus of the user account. Here, the user account may refer to an account of a worker who uses the simulation device 200, and the operation capability information is information indicating the work skill level of the user, and may include work speed, evaluation score, and the like. Additionally, when the corresponding user solves all predetermined types of training scenarios, the test performer 220 may determine whether the user passes the simulation training based on operation capability information for each training scenario.

The user manager 230 may perform managing registration, modification, deletion and the like of a user account associated with a user who uses the simulation device 200. According to an example embodiment, the user may use the simulation device 200 using the registered user account thereof. In this case, the user manager 230 may store and manage whether each training scenario (or defect scenario) for each user account is resolved, and operation capability information corresponding to each training scenario in an arbitrary database. Using the information stored by the user manager 230, the scenario manager 210 may extract information associated with a specific user account stored in the database, and extract or determine at least one of a plurality of training scenarios based on the extracted information. For example, the scenario manager 210 may extract and generate only a training scenario in which the working speed is lower than the average working speed based on the information associated with the user account or provide it to the user, but is not limited thereto, and a training scenario may be extracted or determined by any other criterion or combination of any criteria.

In FIG. 2, each functional configuration included in the simulation device 200 is described separately, but this is only to help the understanding of the disclosure, and one computing device may perform two or more functions. By such a configuration, the simulation device 200 may generate and provide a training scenario and/or a failure scenario having various values associated with the secondary battery production apparatus to the user, and accordingly, the user may train the operation method of the apparatus or effectively learn the countermeasures for each malfunction situation while solving the malfunction situation that may occur in the real apparatus by himself/herself.

Figure 3:
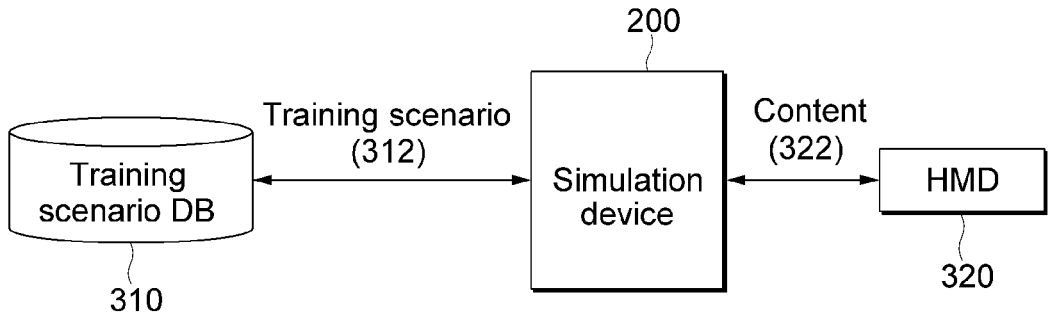
FIG. 3 is a diagram illustrating an example in which a simulation device provides content by extracting a training scenario according to an example embodiment.

FIG. 3 is a diagram illustrating an example in which a simulation device 200 provides content 322 by extracting a training scenario 312 according to an example embodiment. As described above, the simulation device 200 may determine one or more training scenarios 312 among a plurality of training scenarios associated with the secondary battery production apparatus, and may change the content 322 associated with the secondary battery production apparatus based on the determined one or more training scenarios 312. As shown, the simulation device 200 may extract one or more training scenarios 312 from the training scenario DB 310 and provide the content 322 corresponding to the extracted training scenario 312 to the HMD 320.

According to an example embodiment, the plurality of training scenarios may include an electrode replacement scenario associated with a secondary battery production apparatus (e.g., an L&S device). When the electrode replacement scenario is determined as the training scenario, the simulation device 200 may generate or change content by determining one or more electrode suppliers requiring electrode replacement among a plurality of electrode suppliers associated with the secondary battery production apparatus. When an electrode replacement scenario is generated, the user may move to the determined electrode supplier unwinder and manipulate or set the corresponding electrode supplier with an HMI associated with the virtual secondary battery production apparatus. For example, the user may stop the operation of the electrode supplier by manually selecting a virtual HMI or the like. Then, the user may prepare an auto splice by cutting the electrode and attaching a connecting tape.

In this case, the simulation device may operate the determined one or more electrode suppliers, obtain first user behavior information for cutting and connecting electrodes associated with one or more electrode suppliers, and determining whether the electrode replacement scenario is completed based on the obtained first user behavior information. For example, the simulation device may determine that the electrode replacement scenario is completed when the user cuts the electrodes in a predetermined order from one or more electrode suppliers determined and attaches a connecting tape. In this case, cutting accuracy, connection accuracy, and the like may be calculated or determined.

Additionally or alternatively, the plurality of training scenarios may include a separator replacement scenario associated with the secondary battery production apparatus. When the separator replacement scenario is determined as the training scenario, the simulation device 200 may determine one or more separator suppliers requiring separator replacement among a plurality of separator suppliers associated with the secondary battery production apparatus to generate or change content. When a separator replacement scenario is generated, the user may move to the determined separator supplier unwinder and operate or set the corresponding separator supplier with an HMI associated with the virtual secondary battery production apparatus, and the like. For example, a user may dispose of an exhausted separator for which auto splicing has been completed, insert a new separator, and manually manipulate a virtual HMI and the like to perform an operation of preparing the next separator auto splice. Then, the user may perform an operation of cutting the separator and attaching a connection tape, and may perform an operation of removing the exhausted separator by restarting the separator supplier.

The simulation device may obtain second user behavior information for manipulating the determined one or more separator suppliers, discarding the exhausted separator associated with the one or more separator suppliers, inserting a new separator, and operating the HMI to prepare and auto splice, and may determine whether the separator replacement scenario is completed based on the obtained second user behavior information. For example, when the user discards the exhausted separators in a predetermined order from one or more separator suppliers determined by the user, then inserts a new separator and manually manipulates a virtual HMI, and the like to perform an operation of preparing the next separator auto splice, the simulation device may determine that the separator replacement scenario is completed. In this case, cutting accuracy, connection accuracy, and the like may be calculated or determined.

Additionally or alternatively, the plurality of training scenarios may include a staking tape replacement scenario associated with the secondary battery production apparatus. When the stacking tape replacement scenario is determined as the training scenario, the simulation device 200 may generate or change content by determining one or more tape suppliers requiring tape replacement among a plurality of tape suppliers associated with the secondary battery production apparatus. When a stacking tape replacement scenario is generated, the user may move to the determined tape supplier and manipulate or set the corresponding tape supplier with the HMI associated with the virtual secondary battery production apparatus, or the like. For example, the user may stop the operation of the tape supplier by selecting the virtual HMI or the like with his/her hand. Then, the user may perform the operation of removing the exhausted tape from the tape supplier and inserting a new tape, and the operation of restarting the equipment after checking the cutting quality by manipulating the HMI.

The simulation device may obtain third user behavior information for manipulating the determined one or more tape suppliers, and removing the exhausted tape from the one or more tape suppliers and inserting a new tape, and may determine whether the stacking tape replacement scenario is completed based on the obtained third user behavior information. For example, when the user removes the tape from one or more determined tape suppliers in a predetermined order and inserts a new tape, then performs the operation of reading the tape and restarting the tape supplier of the HMI, the simulation device may determine that the stacking tape replacement scenario is completed.

Additionally or alternatively, the plurality of training scenarios may include a quality check scenario of materials (e.g., mono-cells, stack cells, etc.) generated by the secondary battery production apparatus. When the quality check scenario is determined as the training scenario, the user may determine at least some of the dimensions, the cutting state, and the sealing state of the material generated by the secondary battery production apparatus. For example, the user may collect a sample from the mono-cell vision inspector and check the dimensions, surface, cutting state, sealing state, etc. of the mono-cell using a lupe tool or the like. In another example, the user may check the appearance tabs, tapes, separators, electrode protrusions, etc. after taking a sample from the stack cell appearance inspector. In this case, the user may input the dimension, state, etc. of the checked material through a separate input window or the like.

The simulation device may obtain fourth user behavior information for determining at least some of the dimension, cutting state, and sealing state of the material generated by the secondary battery production apparatus, and may determine whether the quality check scenario is completed based on the obtained fourth user behavior information. For example, the simulation device may determine whether the quality check scenario is completed based on whether the user checks the surfaces of mono-cells, stack cells, etc. in a predetermined order, whether certain pre-determined tools are used, and whether the entered figures, conditions, etc. are correct.

Additionally or alternatively, the plurality of training scenarios may include a screening scenario for screening defective material. When the screening scenario is determined as the training scenario, the user may determine whether each mono-cell generated by the secondary battery production apparatus is defective. For example, the user may perform the operation of extracting mono-cells by removing the tape from the stacked cells generated by the secondary battery production apparatus, the operation of measuring the insulation resistance of the extracted mono-cell, the operation of determining whether the mono-cell is defective based on the gap between the electrode and the separator and whether the shoulder line is defective, the operation of reinserting the good product into the stacking facility, etc. In this case, the user may determine the measured insulation resistance of each mono-cell, whether there is a defect, and the like by comparing it with the work standard in the simulator.

The simulation device may obtain fifth user behavior information for extracting a mono-cell from the stack cell generated by the secondary battery production apparatus, measuring the insulation resistance of the extracted mono-cell, performing an electrode surface condition inspection, and measuring the gap between the electrode and the separator and whether the shoulder line is defective, and may determine whether the screening scenario is completed based on the obtained fifth user behavior information. For example, when the user performs operations such as extracting the mono-cells in a predetermined order, measuring the insulation resistance of the extracted mono-cells, performing an electrode surface condition inspection, measuring the gap between the electrode and the separator and whether the shoulder line is defective, and determining whether a mono-cell is defective based on the measured value, the simulation device may determine that the screening scenario is completed.

Additionally or alternatively, the plurality of training scenarios may include disconnection measure scenarios. When the disconnection measure scenario is determined as the training scenario, the simulation device may determine the disconnection location associated with the virtual secondary battery production apparatus. In this case, the user may perform an operation of checking the HMI, etc. to confirm the disconnection location (e.g., coincident part, path-line, cutter part, etc.), an operation of removing the disconnected electrode by manipulating the virtual secondary battery production apparatus, an operation of reconnecting by reading a new electrode, an operation of restarting the equipment after checking the electrode cutting status and judging whether there is an abnormality.

The simulation device may obtain sixth user behavior information for removing the disconnected electrode at the determined disconnection location and connecting a new electrode, and may determine whether the disconnection measure scenario is completed based on the obtained sixth user behavior information. For example, when the user performs an operation such as removing the disconnected electrode and connecting a new electrode in a predetermined order, the simulation device may determine that the disconnection measure scenario is completed.

In FIG. 3, it is described above that one training scenario is generated and processed by the user, but the present disclosure is not limited thereto, and a plurality of training scenarios may be generated in a complex manner at the same time. With such a configuration, the user may use the virtual VR-based simulation device to perform the training necessary for driving or operating the secondary battery production apparatus in advance, and when put into the real production process accordingly, the loss that may be caused by a new worker may be significantly reduced.

Figure 4:
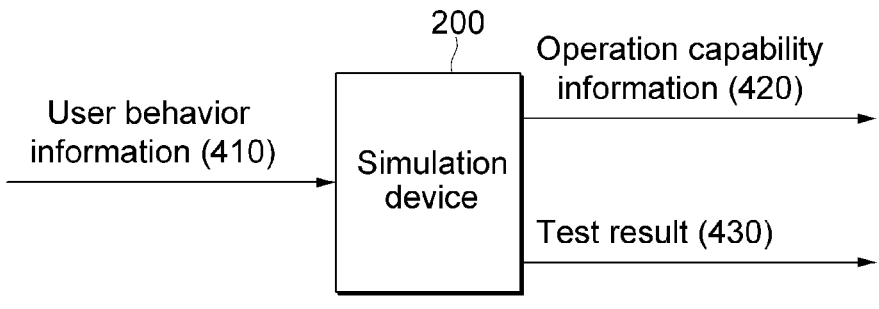
FIG. 4 is a diagram illustrating an example in which operation capability information and test results are generated according to an example embodiment.

FIG. 4 is a diagram illustrating an example in which operation capability information 420 and a test result 430 are generated according to an example embodiment. As described above, when a training scenario (or defect scenario) is generated, the simulation device 200 may receive the user behavior information 410 and the like from the user (HMD associated with the user, a controller, etc.), and determine whether the training scenario is resolved based on the received user behavior information 410 or the like.

According to an example embodiment, when the training scenario is determined to be resolved, the simulation device 200 may calculate a running time of the training scenario and an erroneous operation procedure conversion value while the training scenario is in progress, and may generate the operation capability information 420 for the virtual secondary battery production apparatus of the user account based on the calculated progress time and the erroneous operation procedure conversion value. Here, the user's training score may be calculated using an arbitrary algorithm based on the user's operation order, operation accuracy, and the like, but is not limited thereto.

According to an example embodiment, the test result 430 may be output together with the operation capability information 420. For example, a user associated with the corresponding user account may perform a test for any training scenario, and when all training scenarios associated with a specific secondary battery production apparatus is solved according to the predetermined criteria, the simulation device 200 may determine that the user has passed the simulation test for the secondary battery production apparatus.

Figure 5:
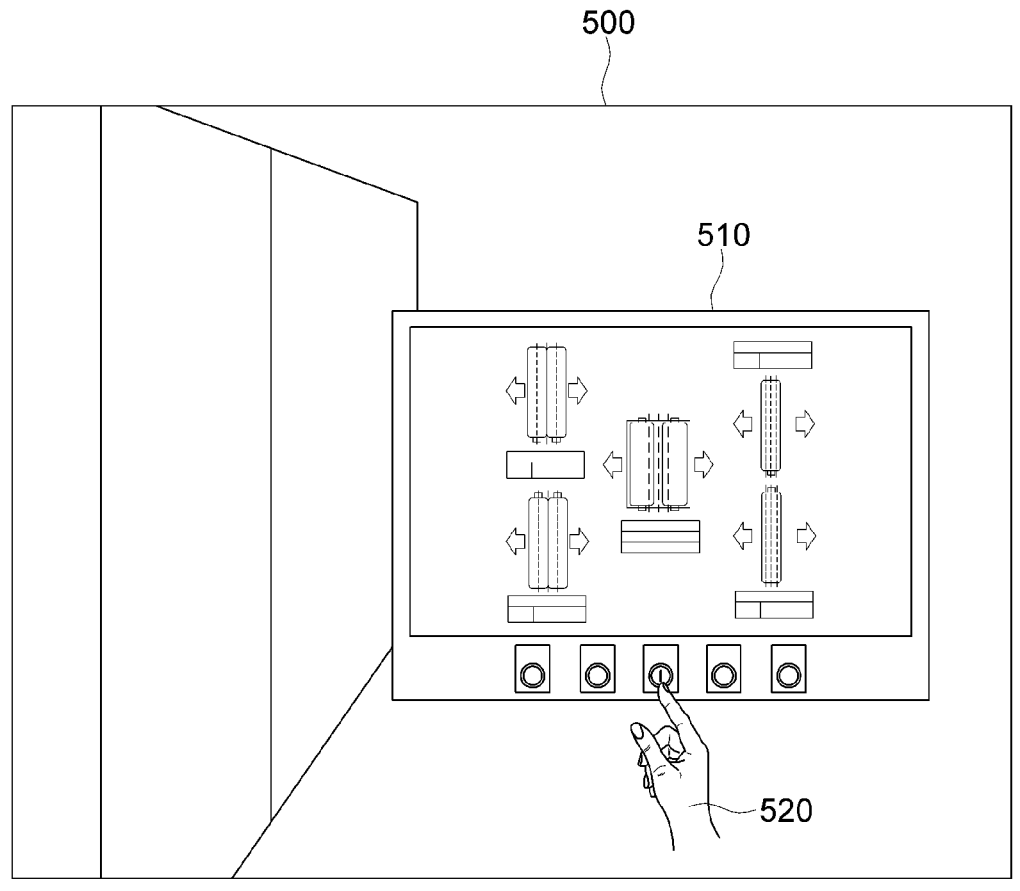
FIG. 5 is a diagram illustrating an example of a display screen on which VR-based content is displayed according to an example embodiment.

FIG. 5 is a diagram illustrating an example of a display screen 500 on which VR-based content is displayed according to an example embodiment. As described above, on the display screen 500 of the HMD, content associated with the secondary battery production apparatus corresponding to the gaze direction and the gaze location of the user may be displayed. In this case, the content may be displayed together on any display device (e.g., a monitor) associated with the HMD.

According to an example embodiment, the content may include VR images and animations of a plant and facilities including a secondary battery production apparatus implemented in virtual reality. In the illustrated example, the content may include an HMI (e.g., a facility operator) 510 including a plurality of adjustment parameters that may determine or adjust the operation of the secondary battery production apparatus (e.g., L&S device), an image representing a user's hand motion sensed using a controller, and the like. The user may experience a virtual secondary battery production facility using a VR device composed of an HMD and controller.

According to an example embodiment, the user may change or adjust the condition value of at least some of the plurality of adjustment parameters included in the HMI 510 to execute or change the operation of the secondary battery production apparatus. For example, the user may execute or change the operation of the secondary battery production apparatus by selecting an area corresponding to an icon capable of changing at least some of the plurality of adjustment parameters using the touch input 520 or the like. In other words, the operation of the virtual secondary battery production apparatus may be adaptively changed or corrected by the change of the adjustment parameter input by the user.

According to an example embodiment, the simulation device may change the operation of the virtual secondary battery production apparatus based on each condition value of the adjustment parameter input by the user, or change the quality information generated by the changed operation of the virtual secondary battery production apparatus. Additionally or alternatively, the user may change the set value of the virtual secondary battery production apparatus by performing a physical action such as touching or dragging the virtual secondary battery production apparatus. In this case, the simulation device may change the operation of the virtual secondary battery production apparatus based on the set value changed by the user, or may change the quality information generated by the changed operation of the virtual secondary battery production apparatus.

Figure 6:
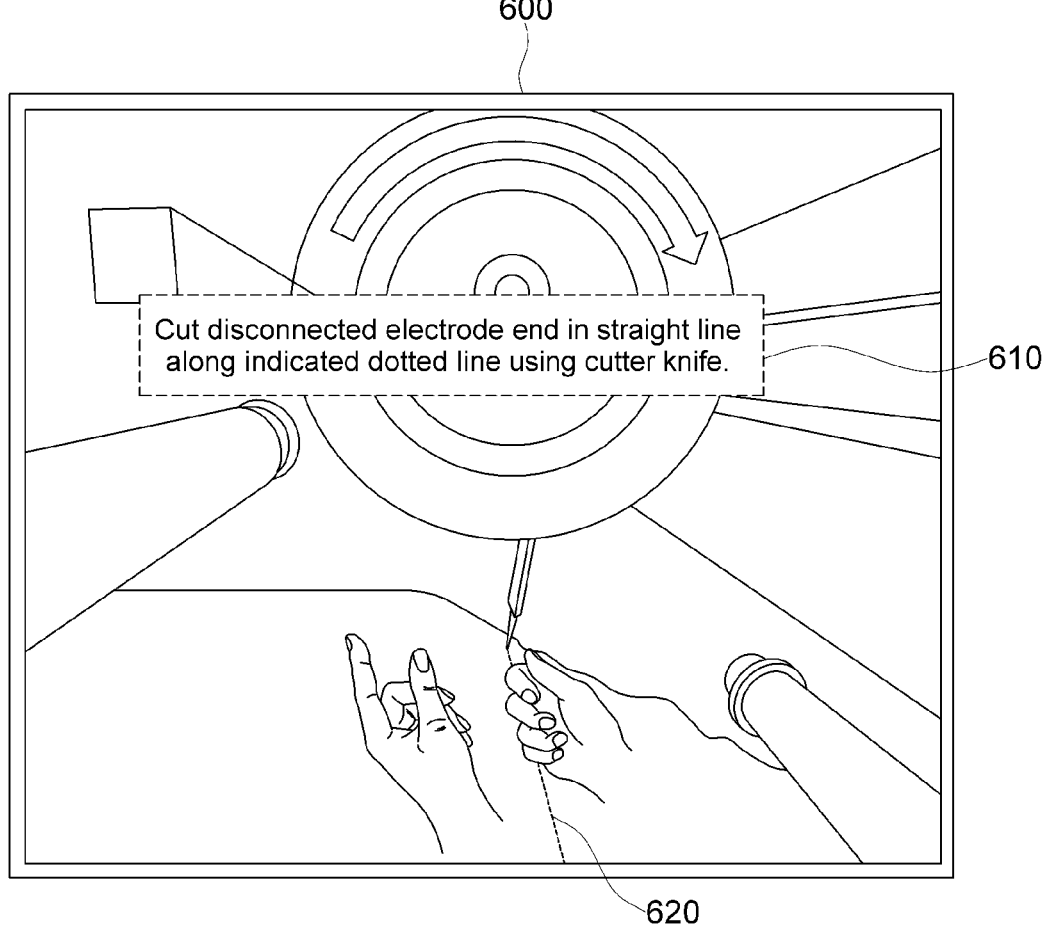
FIG. 6 is a diagram illustrating an example of a display screen on which user guide information is displayed according to an example embodiment.

FIG. 6 is a diagram illustrating an example of a display screen 600 on which user guide information 610 is displayed according to an example embodiment. As described above, content associated with the secondary battery production apparatus corresponding to the gaze direction and gaze location of the user may be displayed on the display screen 600 of the HMD. In this case, the content may be displayed together on any display device (e.g., a monitor) associated with the HMD.

As illustrated, when a disconnection measure scenario is generated, the user may perform an operation of removing the disconnected electrode at the disconnection location and connecting a new electrode. For example, the user may select a cutter knife tool by a touch input or the like, and then use the tool to remove the disconnected electrode and connect a new electrode. In this case, user guide information 610 for guiding the user to a necessary operation and/or a line 620 for removing electrodes may be displayed on the display screen 600.

According to an example embodiment, the simulation device may determine whether the user satisfies the guide condition based on the gaze direction and the gaze location of the user. For example, when the user is within a predetermined distance from the disconnection position associated with the disconnected electrode, the simulation device may determine that the guide condition is satisfied, but is not limited thereto. In another example, the simulation device may determine that the guide condition is satisfied when the user gazes at the disconnection location for a predetermined time.

When it is determined that the user satisfies the guide condition, the simulation device may display user guide information 610 associated with one or more determined training scenarios together with content associated with the secondary battery production apparatus. In the illustrated example, the user guide information 610 may include a guide message such as "cut the disconnected electrode end in a straight line along the indicated dotted line using a cutter knife." With such a configuration, the user may effectively perform training using the user guide information 610 even if the user does not know how to respond to the training scenario.

FIG. 7 is a diagram illustrating an example of a display screen 700 on which operation capability information 710 is displayed according to an example embodiment. As described above, on the display screen 700 of the HMD, content associated with the secondary battery production apparatus corresponding to the gaze direction and the gaze location of the user may be displayed. In this case, the content may be displayed together on any display device (e.g., a monitor) associated with the HMD.

According to an example embodiment, the simulation device may determine whether at least some of the plurality of training scenarios associated with the secondary battery production apparatus are completed by the user, and when at least some of the plurality of training scenarios are determined to be completed, may calculate the operation capability information 710 of the user corresponding to at least some of the plurality of completed training scenarios. In this case, the calculated user's operation capability information 710 may be displayed together with content associated with the secondary battery production apparatus, but is not limited thereto.

In the illustrated example, the operation capability information 710 may include a required time, a procedure result, an erroneous operation procedure, an evaluation score, and the like. For example, each training scenario may include a plurality of procedures, and the simulation device may determine whether the user performs the plurality of procedures with an accuracy greater than or equal to a predetermined standard according to a predetermined order. When a user performs a procedure out of order or with an accuracy less than a predetermined criterion, the simulation device may determine the procedure as an erroneous operation procedure. Then, the simulation device may calculate and provide an evaluation score for a specific training scenario of the corresponding user using the total required time, the number of erroneous operation procedures, and the like. With such a configuration, a user may intensively train only a training scenario with a low job skill level by simply identifying and processing a training scenario lacking training.

Figure 8:
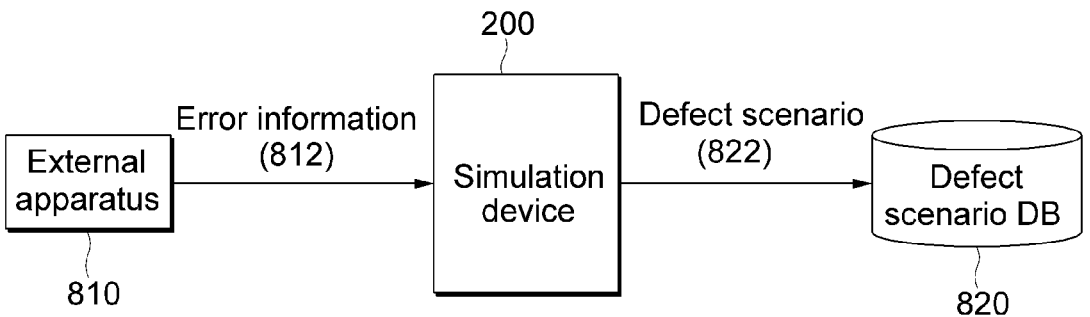
FIG. 8 is a diagram illustrating an example in which a defect scenario is generated according to an example embodiment.

FIG. 8 is a diagram illustrating an example in which a defect scenario 822 is generated according to an example embodiment. As shown, the simulation device 200 may communicate with an external apparatus (e.g., secondary battery production apparatus) 810, a defect scenario DB 820, and the like, and may exchange data and/or information necessary for generating a defect scenario 822.

According to an example embodiment, when a malfunction occurs in the external apparatus 810, the simulation device 200 may receive or obtain error information 812 associated with the malfunction occurring from the external apparatus 810. Here, the error information 812 may include operation information of the external apparatus 810 at the time when the malfunction occurs and the amount of quality change of the material generated by the external apparatus 810. In this case, the simulation device 200 may determine a condition value, a set value, and/or a value of each quality parameter of the quality information of the virtual secondary battery production apparatus to correspond to the corresponding error information 812, and generate a defect scenario 822 having the determined condition value, set value, and/or quality parameter value of the virtual secondary battery production apparatus. The generated defect scenario 822 may be stored and managed in the defect scenario DB 820. For example, the simulation device 200 may determine a condition value, a set value and/or a value of each quality parameter of the quality information of the virtual secondary battery production apparatus to correspond to the error information 812 by using an arbitrary algorithm and/or trained machine learning model for generating a defect scenario 822, and generate a defect scenario 822.

According to an example embodiment, the simulation device 200 may convert the operation information of the external apparatus 810 into a first set of parameters associated with the operation of the virtual secondary battery production apparatus, and convert the quality change amount of the material generated by the external apparatus 810 into a second set of parameters associated with quality information associated with the quality of the material generated by the virtual secondary battery production apparatus. Then, the simulation device 200 may determine a category of a malfunction occurring in the external apparatus 810 using the converted first set of parameters and the second set of parameters, and may generate a defect scenario based on the determined category, the first set of parameters, and the second set of parameters.

In FIG. 8, it is described above that a defect scenario is generated when a malfunction occurs in the external apparatus 810, but the present disclosure is not limited thereto, and for example, defect scenario may be predetermined by an arbitrary user. In another example, a defect scenario may be generated by randomly determining set values, condition values, and quality information associated with the virtual secondary battery production apparatus within a predetermined abnormal range. With such a configuration, the user may effectively improve the ability to respond to defects by training using a defect scenario generated based on a malfunction occurring in a real work environment.

FIG. 9 is a diagram illustrating an example of a VR-based simulation method 900 for producing a secondary battery according to an example embodiment. The VR-based simulation method 900 for secondary battery production may be performed by a processor (e.g., at least one processor of a simulation device). As shown, the VR-based simulation method 900 for secondary battery production may be started by the processor receiving the gaze direction and gaze location of the user identified from the HMD (S910).

The processor may display content associated with the secondary battery production apparatus corresponding to the received gaze direction and gaze location based on the area on the display of the HMD (S920). In this case, the content may be displayed together on any monitor (display device) associated with the HMD.

The processor may obtain user behavior information indicating the motion of the user determined from at least one of the HMD and the controller associated with the HMD (S930). In addition, the processor may execute content associated with the secondary battery production apparatus based on the obtained user behavior information (S940). According to an example embodiment, the processor may determine one or more training scenarios among a plurality of training scenarios associated with the secondary battery production apparatus, and change content associated with the secondary battery production apparatus based on the determined one or more training scenarios.

Figure 10:
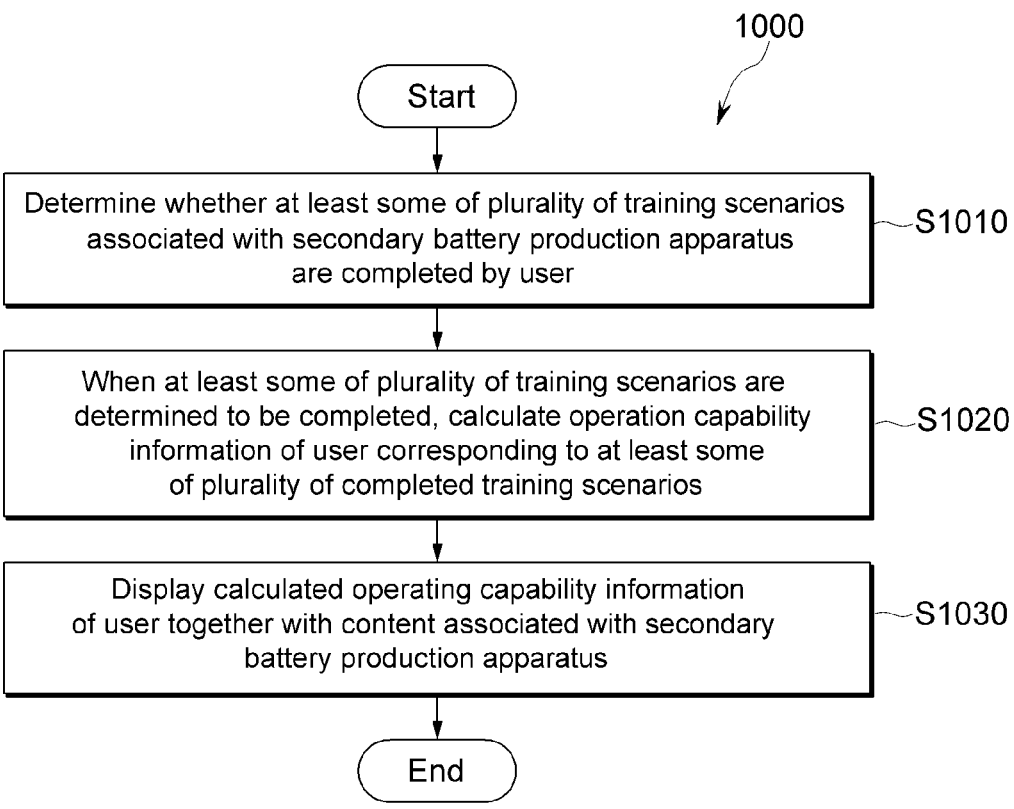
FIG. 10 is a diagram illustrating an example of a test result calculation method according to an example embodiment.

FIG. 10 is a diagram illustrating an example of a test result calculation method 1000 according to an example embodiment. The test result calculation method 1000 may be performed by a processor (e.g., at least one processor of the simulation device). As shown, in the test result calculation method 1000, the processor may determine whether at least some of a plurality of training scenarios associated with the secondary battery production apparatus are completed by the user (S1010).

When at least some of the plurality of training scenarios are determined to be completed, the processor may calculate operation capability information of the user corresponding to at least some of the plurality of completed training scenarios (S1020). In addition, the processor may display the calculated operating capability information of the user together with content associated with the secondary battery production apparatus (S1030). For example, the processor may calculate operation capability information by inputting the user's operation sequence, operation accuracy, response time, etc., to an arbitrary algorithm, machine learning model, etc., but is not limited thereto.

Figure 11:
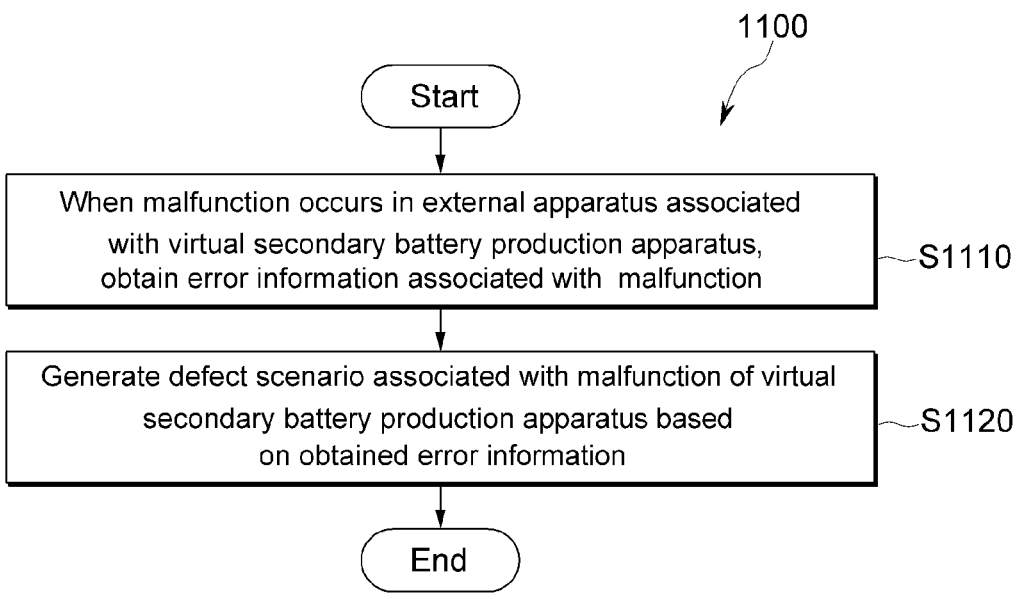
FIG. 11 is a diagram illustrating an example of a defect scenario generation method according to an example embodiment.

FIG. 11 is a diagram illustrating an example of a defect scenario generation method 1100 according to an example embodiment. The defect scenario generation method 1100 may be performed by a processor (e.g., at least one processor of the simulation device). As shown, the defect scenario generation method 1100 may be initiated by the processor obtaining error information associated with the malfunction when a malfunction occurs in an external apparatus associated with the virtual secondary battery production apparatus (S1110).

The processor may generate a defect scenario associated with a malfunction of the virtual secondary battery production apparatus based on the obtained error information (S1120). Here, the error information may include a value of each adjustment parameter and a set value of the corresponding production equipment when the real secondary battery production equipment associated with the virtual secondary battery production apparatus malfunctions. For example, when the quality of the material produced by the secondary battery production equipment is out of a predetermined normal range, it may be determined that a malfunction has occurred, and when it is determined that a malfunction has occurred, the processor may obtain error information associated with the malfunction and generate a defect scenario associated with a malfunction of the virtual secondary battery production apparatus based on the obtained error information.

Figure 12:
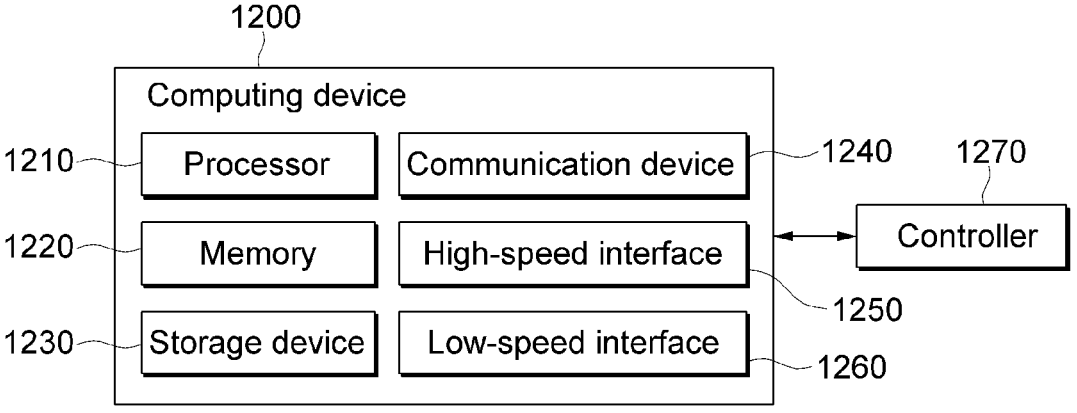

FIG. 12 is a diagram illustrating an exemplary computing device 1200 for performing the above-described method and/or example embodiment, and the like. According to an example embodiment, the computing device 1200 may be implemented using hardware and/or software configured to interact with a user. Here, the computing device 1200 may include the above-described simulation device (200 in FIG. 2). For example, the computing device 1200 may be configured to support a virtual reality (VR), augmented reality (AR), or mixed reality (MR) environment, but is not limited thereto. The computing device 1200 may include a laptop, a desktop, a workstation, a personal digital assistant, a server, a blade server, a main frame, etc., but is not limited thereto. The components of computing device 1200 described above, their connection relationships, and their functions are intended to be illustrative, and not intended to limit the implementations of the disclosure described and/or claimed herein.

The computing device 1200 includes a processor 1210, a memory 1220, a storage device 1230, a communication device 1240, a high-speed interface 1250 connected to the memory 1220 and high-speed expansion port, and a low-speed interface 1260 connected to the low-speed bus and storage device. Each of the components 1210, 1220, 1230, 1240, and 1250 may be interconnected using a variety of buses, mounted on the same main board, or mounted and connected in another suitable manner. The processor 1210 may be configured to process instructions of a computer program by performing basic arithmetic, logic, and input/output operations. For example, the processor 1210 may process instructions stored in the memory 1220, storage device 1230, etc., and/or instructions executed within the computing device 1200 to display graphic information on an external input/output device 1270, such as a display device connected to the high-speed interface 125.

The communication device 1240 may provide a configuration or function for the input/output device 1270 and the computing device 1200 to communicate with each other through a network, and may provide a configuration or function for supporting the input/output device 1270 and/or the computing device 1200 to communicate with other external devices, etc. For example, a request or data generated by a processor of an external apparatus according to an arbitrary program code may be transmitted to the computing device 1200 through a network under the control of the communication device 1240. Conversely, a control signal or instruction provided under the control of the processor 1210 of the computing device 1200 may be transmitted to another external apparatus through the communication device 1240 and a network.

In FIG. 12, the computing device 1200 is illustrated as including one processor 1210, one memory 1220, and the like, but is not limited thereto, and the computing device 1200 may be implemented using a plurality of memories, a plurality of processors, and/or a plurality of buses, etc. In addition, although it has been described above that one computing device 1200 exists in FIG. 12, the present disclosure is not limited thereto, and a plurality of computing devices may interact and perform an operation necessary to execute the above-described method.

The memory 1220 may store information in the computing device 1200. According to an example embodiment, the memory 1220 may include a volatile memory unit or a plurality of memory units. Additionally or alternatively, the memory 1220 may include a non-volatile memory unit or a plurality of memory units. In addition, the memory 1220 may include another type of computer-readable medium, such as a magnetic disk or an optical disk. In addition, an operating system and at least one program code and/or instruction may be stored in the memory 1220.

The storage device 1230 may be one or more mass storage devices for storing data for computing device 1200. For example, the storage device 1230 may be a non-transitory computer-readable medium including magnetic discs such as hard disks, removable disks, optical discs, semiconductor memory devices such as erasable programmable read-only memory (EPROM), electrically erasable PROM (EE-PROM), flash memory devices, CD-ROM and DVD-ROM, or may be configured to include such a non-transitory computer-readable medium. In addition, the computer program may be tangibly embodied in such a non-transitory computer-readable medium.

The high-speed interface 1250 and the low-speed interface 1260 may be means for interaction with the input/output device 1270. For example, input devices may include devices such as cameras, keyboards, microphones, mice, etc., including audio sensors and/or image sensors, and output devices may include devices such as displays, speakers, haptic feedback devices, and the like. In another example, the high-speed interface 1250 and the low-speed interface 1260 may be means for interfacing with a device in which a configuration or function for performing input and output, such as a touch screen, is integrated into one.

According to an example embodiment, while the high-speed interface 1250 manages bandwidth-intensive operations for computing device 1200, the low-speed interface 1260 may manage lower bandwidth intensive operations than the high-speed interface 1250, but such function assignment is merely exemplary. According to an example embodiment, the high-speed interface 1250 may be coupled to the memory 1220, the input/output device 1270, and high-speed expansion ports capable of accommodating various expansion cards (not shown). In addition, the low-speed interface 1260 may be coupled to the storage device 1230 and the low-speed expansion port. Additionally, the low-speed expansion port that may include various communication ports (e.g., USB, Bluetooth, Ethernet, Wireless Ethernet) may be coupled to one or more input/output devices 1270 such as a keyboard, a pointing device, a scanner, or a networking device such as a router, a switch, etc., through a network adapter or the like.

The computing device 1200 may be implemented in a number of different forms. For example, the computing device 1200 may be implemented as a standard server, or a group of such standard servers. Additionally or alternatively, the computing device 1200 may be implemented as part of a rack server system, or implemented as a personal computer, such as a laptop computer. In this case, components from the computing device 1200 may be coupled to other components in any mobile device (not shown). Such computing device 1200 may include, or be configured to communicate with, one or more other computing devices.

In FIG. 12, the input/output device 1270 is not included in the computing device 1200, but is not limited thereto, and may be configured as a single device with the computing device 1200. In addition, in FIG. 12, the high-speed interface 1250 and/or the low-speed interface 1260 is illustrated as an element configured separately from the processor 1210, but is not limited thereto, and the high-speed interface 1250 and/or the low-speed interface 1260 may be configured to be included in the processor.

The methods and/or various example embodiments as described above may be implemented in digital electronic circuitry, computer hardware, firmware, software, and/or combinations thereof. Example embodiments of the present disclosure may be implemented as a non-transitory computer-readable medium and/or a computer program stored in a non-transitory computer-readable medium or executed by a data processing apparatus, e.g., one or more programmable processors and/or one or more computing device. The computer program as described above may be written in any form of a programming language, including compiled or interpreted languages, and may be deployed in any form, including as a stand-alone program, a module, a subroutine, or the like. A computer program may be deployed through one computing device, multiple computing devices connected by the same network and/or multiple computing devices connected by a plurality of different networks.

The methods and/or various example embodiments as described above may be performed by one or more processors configured to execute one or more computer programs that process, store, and/or manage any operations, functions, etc., by operating or generating output data based on input data. For example, the methods and/or various example embodiments of the present disclosure may be performed by a special purpose logic circuit such as a field programmable gate array (FPGA) or application specific integrated circuit (ASIC), and the device and/or system for performing the methods and example embodiments of the present disclosure may be implemented as special purpose logic circuits such as FPGAs or ASICs.

One or more processors for processing a computer program may include both general or special purpose microprocessors, and/or any one or more processors of any kind of digital computing device. A processor may receive instructions and/or data from a read-only memory or a random-access memory, or both. Components of a computing device for executing the methods and/or example embodiments of the present disclosure may include at least one processor for executing instructions and one or more memory devices for storing instructions and/or data.

According to an example embodiment, a computing device may receive from and transmit data to one or more mass storage devices for storing data. For example, the computing device may receive data from and/or transmit data to magnetic disks or optical disks. A non-transitory computer readable medium suitable for storing instructions and/or data associated with a computer program may include any type of non-volatile memory including semiconductor memory devices such as erasable programmable read-only memory (EPROM), electrically erasable PROM (EE-PROM), and flash memory devices, but is not limited thereto. For example, the non-transitory computer readable medium may include a magnetic disk such as an internal hard disk or a removable disk, a photomagnetic disk, a CD-ROM and a DVD-ROM disk.

To provide interaction with a user, the computing device may include a display device (e.g., a cathode ray tube (CRT), a liquid crystal display (LCD), etc.) for presenting or displaying information to the user, and a pointing device (e.g., a keyboard, mouse, trackball, etc.) through which the user may provide input and/or commands, or the like, on the computing device, but is not limited thereto. In other words, the computing device may further include any other kind of device for providing interaction with the user. For example, the computing device may provide any form of sensory feedback to the user for interaction with the user, including visual feedback, auditory feedback, and/or tactile feedback, and the like. In contrast, the user may provide an input to the computing device through various gestures such as sight, voice, and motion.

In the present disclosure, various example embodiments may be implemented in a computing device including a back-end component (e.g., a data server), a middleware component (e.g., an application server) and/or a front-end component. In this case, the components may be interconnected by any form or medium of digital data communication, such as a communication network. According to an example embodiment, the communication network may include wired networks such as Ethernet, Power Line Communication, telephone line communication apparatus, and RS-serial communication, mobile communication networks, wireless networks such as WLAN (Wireless LAN), Wi-Fi, Bluetooth, and ZigBee, or a combination thereof. For example, the communication network may include a local area network (LAN), a wide area network (WAN), and the like.

A computing device based on the exemplary embodiments described herein may be implemented using hardware and/or software configured to interact with the user, including a user device, a user interface (UI) device, a user terminal, or a client device. For example, the computing device may include a portable computing device such as a laptop computer. Additionally or alternatively, the computing device may include personal digital assistants (PDA), tablet PCs, game consoles, wearable devices, internet of things (IoT) devices, virtual reality (VR) devices, augmented reality (AR) devices, but is not limited thereto. The computing device may further include other types of devices configured to interact with the user. In addition, the computing device may include a portable communication device suitable for wireless communication over a network such as a mobile communication network (e.g., a mobile phone, a smart phone, a wireless cellular phone, etc.), and the like. The computing device may be configured to communicate with a network server wirelessly using wireless communication technologies and/or protocols such as radio frequency (RF), microwave frequency (MWF), and/or infrared ray frequency (IRF).

In the present disclosure, various example embodiments including specific structural and functional details are illustrative. Therefore, example embodiments of the present disclosure are not limited to those described above, and may be implemented in various other forms. In addition, the terms used herein are intended merely to describe some example embodiments and are not to be construed as limiting the example embodiments. For example, singular words and the above may be construed to include the plurals as well, unless the context clearly dictates otherwise.

Unless otherwise defined herein, all terms used herein including technical or scientific terms have the same meanings as those generally understood by a person skilled in the art. In addition, commonly used terms such as terms defined in the dictionary should be interpreted as having a meaning consistent with the meaning in the context of the related art.

Although the present disclosure has been described with reference to some example embodiments herein, various modifications and changes can be made without departing from the scope of the present disclosure that can be understood by those skilled in the art to which the present disclosure pertains. In addition, the modifications and changes are to be construed as being included within the scope of the appended claims.

What is claimed is:

1. A virtual reality (VR)-based simulation device for secondary battery production, comprising:

a memory configured to store at least one instruction; and at least one processor configured to execute the at least one instruction stored in the memory to perform operations comprising:

receiving a gaze direction and gaze location of a user identified from a head mounted display (HMD);

displaying content associated with a secondary battery production apparatus corresponding to the received gaze direction and gaze location on an area of a display of the HMD;

obtaining user behavior information indicating a motion of the user determined from at least one of the HMD or a controller associated with the HMD;

executing the content associated with the secondary battery production apparatus based on the obtained user behavior information;

accessing a human machine interface (HMI) included in the content by the user; and changing or adjusting one or more parameters included in the HMI by the user, wherein an operation of the secondary battery production apparatus is adaptively changed by the changing or adjustment of the one or more parameters included in the HMI, wherein the operations further comprise:

determining one or more training scenarios among a plurality of training scenarios associated with the secondary battery production apparatus; and changing the content associated with the secondary battery production apparatus based on the determined one or more training scenarios;

wherein the plurality of training scenarios comprise a screening scenario for screening defective materials, and when the determined one or more training scenarios comprise the screening scenario, obtaining first user behavior information for extracting a mono-cell from a stacked cell generated by the secondary battery production apparatus, for measuring an insulation resistance of the extracted mono-cell, for performing an electrode surface condition inspection, and for measuring a gap between an electrode and a separator and whether a shoulder line is defective; and determining whether the screening scenario is completed based on the obtained first user behavior information.

2. The VR-based simulation device for secondary battery production of claim 1, wherein the plurality of training scenarios comprises an electrode replacement scenario associated with the secondary battery production apparatus, and wherein the operations further comprise:

upon determining the one or more training scenarios comprise the electrode replacement scenario, determining one or more electrode suppliers requiring electrode replacement among a plurality of electrode suppliers associated with the secondary battery production apparatus;

obtaining second user behavior information for manipulating the determined one or more electrode suppliers, and for cutting and connecting electrodes associated with the one or more electrode suppliers; and determining whether the electrode replacement scenario is completed based on the obtained second user behavior information.

3. The VR-based simulation device for secondary battery production of claim 1, wherein the plurality of training scenarios comprises a separator replacement scenario associated with the secondary battery production apparatus, and wherein the operations further comprise:

upon determining the one or more training scenarios comprise the separator replacement scenario, determining one or more separator suppliers requiring separator replacement among a plurality of separator suppliers associated with the secondary battery production apparatus;

obtaining third user behavior information for manipulating the determined one or more separator suppliers, for discarding exhausted separators associated with the one or more separator suppliers, and for manipulating HMI after inserting a new separator to prepare an auto splice; and determining whether the separator replacement scenario is completed based on the obtained third user behavior information.

4. The VR-based simulation device for secondary battery production of claim 1, wherein the plurality of training scenarios comprises a stacking tape replacement scenario associated with the secondary battery production apparatus, and wherein the operations further comprise:

when the determined one or more training scenarios comprise the stacking tape replacement scenario, determining one or more tape suppliers requiring tape replacement among a plurality of tape suppliers associated with the secondary battery production apparatus;

obtaining fourth user behavior information for manipulating the determined one or more tape suppliers, for removing exhausted tapes from the one or more tape suppliers, and for inserting a new tape; and determining whether the stacking tape replacement scenario is completed based on the obtained fourth user behavior information.

5. The VR-based simulation device for secondary battery production of claim 1, wherein the plurality of training scenarios comprises a quality check scenario of a material generated by the secondary battery production apparatus, and wherein the operations further comprise:

when the determined one or more training scenarios comprise the quality check scenario, obtaining fifth user behavior information for determining at least one of a dimension, a cutting state, or a sealing state of the material generated by the secondary battery production apparatus; and determining whether the quality check scenario is completed based on the obtained fifth user behavior information.

6. The VR-based simulation device for secondary battery production of claim 1, wherein the plurality of training scenarios comprise a disconnection measure scenario, and wherein the operations further comprise:

when the determined one or more training scenarios comprise the disconnection measure scenario, determining a disconnection location associated with the secondary battery production apparatus;

obtaining sixth user behavior information for removing a disconnected electrode at the determined disconnection location and for connecting a new electrode; and determining whether the disconnection measure scenario is completed based on the obtained sixth user behavior information.

7. The VR-based simulation device for secondary battery production of claim 1, wherein the operations further comprise:

determining whether at least one of the plurality of training scenarios associated with the secondary battery production apparatus are completed by the user;

upon determining the at least one of the plurality of training scenarios is completed, calculating operation capability information of the user corresponding to the completed at least one of the plurality of training scenarios; and displaying the calculated operation capability information of the user together with the content associated with the secondary battery production apparatus.

8. The VR-based simulation device for secondary battery production of claim 1, wherein the operations further comprise:

determining whether the user satisfies a guide condition based on the gaze direction and gaze location of the user; and upon determining that the user satisfies the guide condition, displaying user guide information associated with the determined one or more training scenarios together with the content associated with the secondary battery production apparatus.

9. A virtual reality (VR)-based simulation method for secondary battery production performed by at least one processor, comprising:

receiving a gaze direction and gaze location of a user identified from a head mounted display (HMD);

displaying content associated with a secondary battery production apparatus corresponding to the received gaze direction and gaze location on an area of a display of the HMD;

obtaining user behavior information indicating a motion of the user determined from at least one of the HMD or a controller associated with the HMD;

executing the content associated with the secondary battery production apparatus based on the obtained user behavior information;

accessing a human machine interface (HMI) included in the content by the user; and changing or adjusting one or more parameters included in the HMI by the user, wherein an operation of the secondary battery production apparatus is adaptively changed by the changing or adjustment of the one or more parameters included in the HMI;

determining one or more training scenarios among a plurality of training scenarios associated with the secondary battery production apparatus; and changing the content associated with the secondary battery production apparatus based on the determined one or more training scenarios, wherein the plurality of training scenarios comprise a screening scenario for screening defective materials, and wherein the method further comprises:

when the determined one or more training scenarios comprise the screening scenario, obtaining first user behavior information for extracting a mono-cell from a stacked cell generated by the secondary battery production apparatus, for measuring an insulation resistance of the extracted mono-cell, for performing an electrode surface condition inspection, and for measuring a gap between an electrode and a separator and whether a shoulder line is defective; and determining whether the screening scenario is completed based on the obtained first user behavior information.

10. The VR-based simulation method for secondary battery production of claim 9, wherein the plurality of training scenarios comprise an electrode replacement scenario associated with the secondary battery production apparatus, and wherein the method further comprises:

upon determining the one or more training scenarios comprise the electrode replacement scenario, determining one or more electrode suppliers requiring electrode replacement among a plurality of electrode suppliers associated with the secondary battery production apparatus;

obtaining second user behavior information for manipulating the determined one or more electrode suppliers, and for cutting and connecting electrodes associated with the one or more electrode suppliers; and determining whether the electrode replacement scenario is completed based on the obtained second user behavior information.

11. The VR-based simulation method for secondary battery production of claim 9, wherein the plurality of training scenarios comprise a separator replacement scenario associated with the secondary battery production apparatus, and wherein the method further comprises:

upon determining the one or more training scenarios comprise the separator replacement scenario, determining one or more separator suppliers requiring separator replacement among a plurality of separator suppliers associated with the secondary battery production apparatus;

obtaining third user behavior information for manipulating the determined one or more separator suppliers, for discarding exhausted separators associated with the one or more separator suppliers, and for manipulating HMI after inserting a new separator to prepare an auto splice; and determining whether the separator replacement scenario is completed based on the obtained third user behavior information.

12. The VR-based simulation method for secondary battery production of claim 9, wherein the plurality of training scenarios comprise a stacking tape replacement scenario associated with the secondary battery production apparatus, and wherein the method further comprises:

when the determined one or more training scenarios comprise the stacking tape replacement scenario, determining one or more tape suppliers requiring tape replacement among a plurality of tape suppliers associated with the secondary battery production apparatus;

obtaining fourth user behavior information for manipulating the determined one or more tape suppliers, for removing exhausted tapes from the one or more tape suppliers, and for inserting a new tape; and determining whether the stacking tape replacement scenario is completed based on the obtained fourth user behavior information.

13. The VR-based simulation method for secondary battery production of claim 9, wherein the plurality of training scenarios comprise a quality check scenario of a material generated by the secondary battery production apparatus, and wherein the method further comprises:

when the determined one or more training scenarios comprise the quality check scenario, obtaining fifth user behavior information for determining at least one of a dimension, a cutting state, or a sealing state of the material generated by the secondary battery production apparatus; and determining whether the quality check scenario is completed based on the obtained fifth user behavior information.

14. The VR-based simulation method for secondary battery production of claim 9, wherein the plurality of training scenarios comprise a disconnection measure scenario, and wherein the method further comprises:

when the determined one or more training scenarios comprise the disconnection measure scenario, determining a disconnection location associated with the secondary battery production apparatus;

obtaining sixth user behavior information for removing a disconnected electrode at the determined disconnection location and for connecting a new electrode; and determining whether the disconnection measure scenario is completed based on the obtained sixth user behavior information.

15. The VR-based simulation method for secondary battery production of claim 9, further comprising:

determining whether at least one of the plurality of training scenarios associated with the secondary battery production apparatus are completed by the user;

upon determining the at least one of the plurality of training scenarios is completed, calculating operation capability information of the user corresponding to the completed at least one of the plurality of training scenarios; and displaying the calculated operation capability information of the user together with the content associated with the secondary battery production apparatus.

16. The VR-based simulation method for secondary battery production of claim 9, further comprising:

determining whether the user satisfies a guide condition based on the gaze direction and gaze location of the user; and upon determining that the user satisfies the guide condition, displaying user guide information associated with the determined one or more training scenarios together with the content associated with the secondary battery production apparatus.

17. A non-transitory computer-readable medium storing instructions for executing a virtual reality (VR)-based simulation method for secondary battery production, the instructions, when executed by one or more processors, causing the one or more processors to perform operations comprising:

receiving a gaze direction and gaze location of a user identified from a head mounted display (HMD);

displaying content associated with a secondary battery production apparatus corresponding to the received gaze direction and gaze location on an area of a display of the HMD;

obtaining user behavior information indicating a motion of the user determined from at least one of the HMD or a controller associated with the HMD;

executing the content associated with the secondary battery production apparatus based on the obtained user behavior information;

accessing a human machine interface (HMI) included in the content by the user; and changing or adjusting one or more parameters included in the HMI by the user, wherein an operation of the secondary battery production apparatus is adaptively changed by the changing or adjustment of the one or more parameters included in the HMI;

determining one or more training scenarios among a plurality of training scenarios associated with the secondary battery production apparatus; and changing the content associated with the secondary battery production apparatus based on the determined one or more training scenarios, wherein the plurality of training scenarios comprise a screening scenario for screening defective materials, and wherein the method further comprises:

when the determined one or more training scenarios comprise the screening scenario, obtaining user behavior information for extracting a mono-cell from a stacked cell generated by the secondary battery production apparatus, for measuring an insulation resistance of the extracted mono-cell, for performing an electrode surface condition inspection, and for measuring a gap between an electrode and a separator and whether a shoulder line is defective; and determining whether the screening scenario is completed based on the obtained user behavior information.

* * * * *